Sept. 8, 1925.  
H. S. POWELL  
1,552,645  
OILLESS JOINT FOR THE SPRINGS OF MOTOR VEHICLES  
Filed Dec. 8, 1922
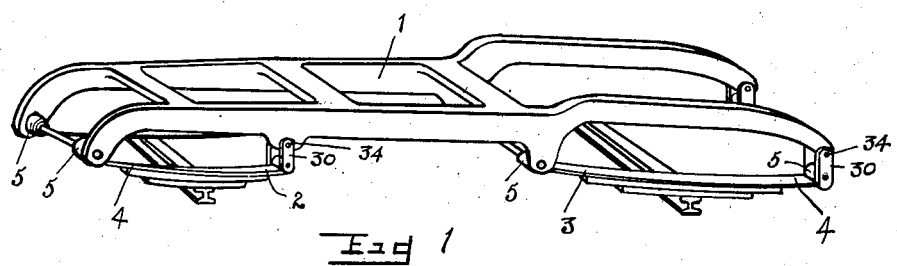
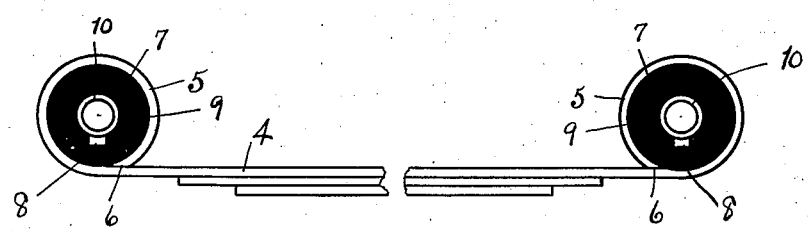
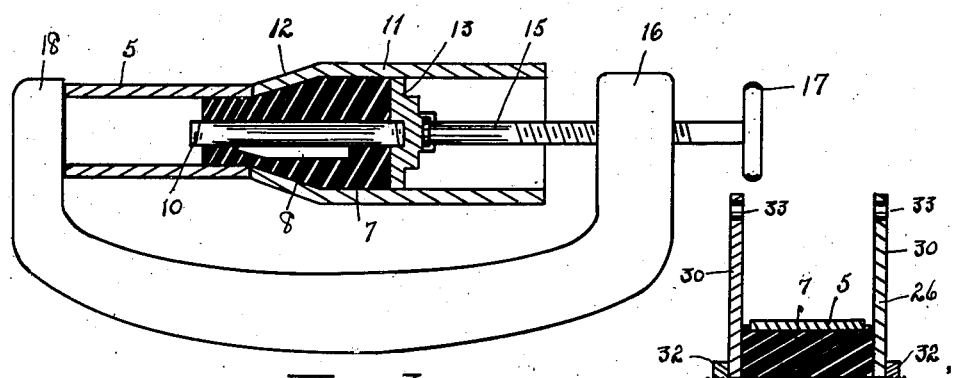
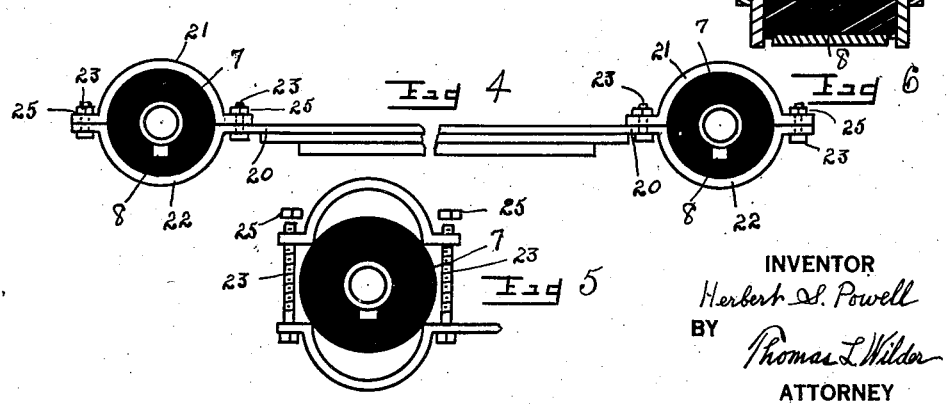
INVENTOR  
Herbert S. Powell  
BY  
Thomas L. Wilder  
ATTORNEY Patented Sept. 8, 1925.

1,552,645

UNITED STATES PATENT OFFICE.

HERBERT S. POWELL, OF NEW HARTFORD, NEW YORK.

OILLESS JOINT FOR THE SPRINGS OF MOTOR VEHICLES.

Application filed December 8, 1922. Serial No. 605,717.

*To all whom it may concern:*

Be it known that I, HERBERT S. POWELL, a citizen of the United States, residing at New Hartford, in the county of Oneida and State of New York, have invented certain new and useful Improvements in Oilless Joints for the Springs of Motor Vehicles, of which the following is a specification, reference being had therein to the accompanying drawing.

My invention relates to an oilless joint for the springs of motor vehicles, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide rubber bushings for use in the spring ends and shackles of automobiles and trucks, whereby to eliminate the use of oil at such locations, as well as to improve the riding qualities of the springs.

In order to utilize rubber for such joints and, thereby, make possible the elimination of oil, it has been found necessary because of the great stresses and wear incident to road shocks and vibrations of the automobile to compress said rubber to a considerable degree between the metal parts of said joints.

The object will appear by referring to the drawings in which

Fig. 1 is a perspective view of a chassis of an automobile showing the improved springs attached thereto;

Fig. 2 is an enlarged detail view, of a spring, parts being broken away;

Fig. 3 is an enlarged detail view, showing the manner of compressing the rubber bushing into the cylindrical end of the spring;

Fig. 4 is an enlarged detail view, showing a modified manner of compressing the rubber bushing into the cylindrical ends of the spring;

Fig. 5 is an enlarged detail view, showing the respective parts of the end of the modified form of spring just before the rubber bushing is compressed.

Fig. 6 is an enlarged detail view, showing the oilless joint used in connection with a shackle.

Referring more particularly to the drawings, a chassis of an automobile is represented by 1. Said chassis is supported by two pairs of leaf springs 2 and 3. The opposite ends of the top leaf 4 are turned, as at 5 to form a cylinder. The free edges of top leaf 4 are beveled at 6 to fit flush against the contiguous surface of leaf 4 where said ends meet said surface. Within cylindrical ends 5 of leaf 4 of the spring are disposed hollow rubber cylinders 7 that are formed with a channel 8 opening into central recess 9. Channel 8 is intended for the reception of a dry lubricant such as talcum or graphite which will be useful in reducing friction should there be any rotary movement between inner sleeve 10 and rubber cylinder 7. Such movement will occur in the event of extreme tension on the parts.

Sleeve 10 that is somewhat longer is forced through recess 9 formed in rubber cylinder 7. Recess 9 is made smaller in diameter than the diameter of sleeve 10, whereby to force the rubber outwardly when said sleeve 10 is inserted. Moreover, rubber cylinders 7 are made much larger in diameter than the diameters of cylindrical ends 5 of leaf 4, whereby said rubber will be compressed inwardly when the rubber cylinders 7 are pressed into assembled position.

The mechanism for forcing rubber cylinders 7 into cylindrical ends 5 embodies an open ended tubular member 11 having a funnel shaped end 12. A piston 13 that is swiveled to the end of a screw threaded thrust rod 15 is adapted to co-operate with member 11, whereby to force the rubber cylinder 7 into the cylindrical end 5 of leaf 4 of the spring. Rod 15 has a threaded bearing in yoke 16. A handle 17 is attached to rod 15 to aid in turning thrust rod 15, whereby to move piston 13 towards or away from funnel shaped end 12. The opposite end 18 of yoke 16 is adapted to engage one end of cylindrical part 5 of leaf 4, whereby part 5 may be held between end 18 and one end of member 11 to allow piston 13 to force rubber cylinder 7 into the chamber formed by said cylindrical end 5.

Figs. 4 and 5 show a modified manner of compressing rubber cylinder 7 within the cylindrical end 5 of leaf spring 4. Here ends 20, 20 are made in two semi cylindrical parts 21 and 22, which are bolted together by members 23, 23. In Fig. 5 part 21 is shown just before it is forced by clamps or other pressing means down into engagement with the threaded ends of bolts 23, 23. After said bolts 23 have been engaged, nuts 25, 25 are screwed down thereon to force parts 21 and 22 together as seen in Fig. 4, whereby to compress rubber cylinders 7 in assembled position.

Fig. 6 shows rubber cylinder 7 used in connection with a shackle 26 having hangers 30, 30 provided with apertures for the reception of hollow tubular member 31. Nuts 32, 32 are screw threaded to the ends of tube 31, whereby to hold the parts together. Apertures 33, 33, are formed in the upper ends of hangers 30, 30, whereby said hangers will be carried by a shaft 34 having bearings in the frame or chassis 1 of the motor vehicle. It will be noted that the ends of rubber cylinder 7 project beyond the ends of cylinder 5, whereby to make contact with the adjacent surfaces of hangers 30, 30 to hold the parts rigidly in position.

Having thus described my invention what I claim as new and desire to secure by Letters Patent is:

1. In an oilless joint, a compressed flexible material forced into a cylindrical chamber, a metallic sleeve projected through said flexible material, hangers attached to said sleeve, and said compressed flexible material projecting beyond the cylindrical chamber to make contact with said hangers, whereby to hold the parts rigidly together.

2. In an oilless joint, a compressed rubber cylinder disposed within a cylindrical chamber, a metallic sleeve projected through said compressed rubber cylinder, whereby to form a bearing, hangers attached to said sleeve, and said compressed rubber cylinder projecting beyond the cylindrical chamber to make contact with said hangers, whereby to hold the parts rigidly together.

3. In an oilless joint for the springs of automobiles, a metallic cylinder, a compressed rubber cylinder disposed therein and having a central aperture, said rubber cylinder forced into said metallic cylinder, a sleeve projecting through said aperture, hangers attached to said sleeve, a channel for carrying a dry lubricant adjacent said sleeve and said compressed rubber cylinder projecting beyond the metallic cylinder to make contact with said hangers, whereby to hold the parts rigidly together.

4. In an oilless joint for the springs of automobiles, a metallic cylinder, a compressed rubber cylinder disposed therein and having a central aperture, a metallic sleeve disposed in said central aperture, hangers attached to said sleeve, a recess formed contiguous with said aperture, whereby to carry a dry lubricant, and said compressed rubber cylinder projecting beyond the metallic cylinder to make contact with said hangers, whereby to hold the parts rigidly together.

In testimony whereof I have affixed my signature.

HERBERT S. POWELL.